United States Patent [19]

Pieh et al.

[11] Patent Number: 5,005,771
[45] Date of Patent: Apr. 9, 1991

[54] PROCESS FOR THE CONTINUOUS DRYING OF HYDROPHILIC POLYMER GELS

[75] Inventors: Stefan Pieh, Leonding; Gerhard Willert, Katsdorf, both of Austria

[73] Assignee: Chemie Linz Gesellschaft m.b.H., Linz, Austria

[21] Appl. No.: 470,076

[22] Filed: Jan. 25, 1990

[30] Foreign Application Priority Data

Jan. 30, 1989 [AT] Austria ................................. 175/89

[51] Int. Cl.$^5$ .............................................. B02C 19/12
[52] U.S. Cl. ........................................... 241/23; 34/12
[58] Field of Search ................. 241/23; 34/12, 17, 60; 432/18

[56] References Cited

U.S. PATENT DOCUMENTS 4,650,126  3/1987  Feder et al. ...................... 241/23 X
4,852,811  8/1989  Adams et al. ..................... 241/23 X

FOREIGN PATENT DOCUMENTS 61-127707  6/1986  Japan .

OTHER PUBLICATIONS

Finch, "Chemistry and Technology of Water soluble Polymers", Ed. C. A. Finch, pp. 1–11, Plenum Press, New York/London (1983).
"Encyclopedia of Polymer Science and Technology 2nd Ed.", vol. 7, pp. 783–802.

Primary Examiner—Timothy V. Eley
Attorney, Agent, or Firm—Wenderoth, Lind & Ponack

[57] ABSTRACT

Process for the continuous drying of hydrophilic polymer gels in a cylindrical dryer with a high speed rotor which conveys the material to be dried through the dryer and prevents agglomeration.

5 Claims, No Drawings

PROCESS FOR THE CONTINUOUS DRYING OF HYDROPHILIC POLYMER GELS

The invention relates to a process for the continuous drying of hydrophilic polymer gels, in which the polymer particles are continuously prevented from agglomerating during drying by means of a high speed rotor.

Hydrophilic polymer gels (hydrogels) occur after polymerization in the form of a rubber-elastic gel with a moisture content of about 50 to 80%. These gels have great adhesion so that they tend to adhere to each other or to the surrounding walls and form agglomerates.

Drying of the hydrogels is assisted by adequate and homogeneous pre-comminution, since the drying rate depends to a large extent on the particle size. Drying of the hydrogels is very difficult and expensive particularly due to their high tack and adhesion since the particles agglomerate very easily or form a solid layer on the dryer wall. This results on the one hand in removal of the water from the hydrogel being made considerably more difficult, and on the other hand in the heat transfer from the heated dryer wall being hampered to a large extent by the adhering insulating layer of hydrogel. Another problem is caused by the formation of a solid polymer skin on the surface of the polymer particles, resulting in the mass transfer rate of water from the hydrogel being very much reduced and the drying process being made more difficult (cf. U.S. Pat. No. 3,905,122, JP-Kokai No. 61-127,707 (1986)).

Avoidance of sticking and agglomeration during drying of gels, in contrast to free-flowing substances, is achieved in particular by ensuring that there is little contact and little or no relative movement between the gel particles. For this reason, the drying of gels is in particular carried out in belt dryers, the drying medium being hot air. U.S. Pat. No. 4,138,539 discloses the predrying of polymer gel granules having a moisture content of 65% by weight on a belt dryer initially for 1 hour at 85° C. to achieve a moisture content of 60% by weight, then breaking the granules and finally, in a further process step, drying them for 1.5 hours at 85° C. to give a residual moisture content of 8.4% by weight. The disadvantage of this process is in particular that it is very expensive and particularly, as a result of the low belt velocity and low layer depth which are necessary for satisfactory drying, that only a low space-time yield, and consequently only a low efficiency, is achieved.

U.S. Pat. No. 3,905,122 discloses drying an extruded hydrogel strand batchwise using hot air in a rotating drum-type dryer. The dryer efficiency in this case is likewise very low and adequate drying can only be achieved after extremely long drying times of up to 270 min.

Other attempts to solve the problem of drying hydrogels resulted in U.S. Pat. No. 4,032,701 which describes the polymerization and simultaneous drying of polyacrylamides making use of the heat of reaction. However, as a result of the high polymerization temperature which develops and the difficult control of the process, an inhomogeneous product is obtained with uncontrolled crosslinking, a high proportion of low molecular weight products and discoloration of the polymer.

Other alternative methods of drying were likewise unhelpful, for instance azeotropic drying with a water-immiscible solvent or pre-treatment with methanol. The disadvantage of this process is in particular that of additional expense and contamination of the environment from the use of solvents and also contamination of the polymer with solvent residues which cannot be completely removed.

The object of the invention is therefore to provide a process for the drying of hydrogels, which avoids the disadvantages of the prior art processes. In particular, the drying time must be reduced so that on the one hand, the time yield can be increased and on the other hand the heat stress of the gel can be reduced, as a result of which it should be possible to achieve gentle drying with substantial avoidance of uncontrolled crosslinking. Furthermore, a uniform non-agglomerated product should be obtained.

This object can be achieved by drying the hydrogel in a heated cylinder fitted with a high speed rotor. It is particularly surprising here that despite the intensive impulse which is given to the tacky hydrogel particles by the rotor, in contrast to the blade dryer with slow-running blades (cf. comparative example V 9), no spherically-shaped agglomerates are formed and no baked-on deposits are formed on the rotor or on the cylinder wall. Furthermore, it is surprising that the intensive mechanical de-agglomeration or prevention of agglomeration does not cause any mechanical damage to the product or any harmful effect on the molecular weight.

The present invention accordingly provides a process for the continuous drying of hydrophilic polymer gels, characterized in that the polymer gels to be dried are introduced into a heated, cylindrical dryer in which, by virtue of a high speed rotor with a circumferential velocity of at least 6 m/sec, they are not only conveyed axially through the dryer and meanwhile dried at 20° to 250° C., but also prevented from agglomerating and partially further comminuted, after which the dried polymer gels are discharged from the dryer.

Examples of polymer gels which can be dried according to the invention are uncrosslinked or crosslinked, i.e. not only water-soluble but also water-insoluble, polymers, which can be in the form of anionic, cationic or ampholytic polyelectrolytes or else of nonionic polymers. The most important water-soluble polymers, which cause drying problems due to their hydrophilic behaviour or water solubility, are compiled in "Chemistry and Technology of Water-Soluble Polymers" published by C. A. Finch, Plenum Press New York and London, 1983, pp. 1–11. The chemically crosslinked polymer gels are products of the copolymerization of polyfunctional water-soluble comonomers or of a chemical crosslinking reaction of water-soluble polymers. Examples of crosslinked water-insoluble hydrogels are compiled for instance in the "Encyclopedia of Polymer Science and Technology" 2nd ed. Vol. 7, pp. 783–802.

The drying process according to the invention can be used for example to dry the following: linear and cross-linked polyacrylic acid, polyacrylamide, poly-N,N-dimethylacrylamide, poly-N-isopropylacrylamides, polymethacrylic acid, polymethacrylamide, polyethylene oxide, polypropylene oxide, polyethylenesulphonic acid, polystyrenesulphonic acid, polyvinyl alcohol, polyvinylamine, polyvinyl methyl ether, polyvinylmethyloxazolidone, polyvinylpyrrolidone, polyvinylpyridine, polyvinylpyridine-N-oxide and polyvinyl sulphate. Biopolymers and their derivatives can also be dried according to the invention. Examples of these are cellulose derivatives, such as methyl, ethyl and carboxymethylcellulose, starch derivatives such as for example starch acetates, hydroxyethyl starch, polysaccharides such as for example alginic acid and salts thereof, ionotropically crosslinked alginates, and proteins such as for example collagen and albumins.

The degree of drying depends on the particular application of the hydrogel and is generally consistent with a residual moisture content of about 5 to 10% by weight. Particularly effective drying is achieved by pre-comminuting the polymer gels before drying, preferably to a particle size or layer thickness of less than 20 mm.

The dryer is preferably heated by external heating of the dryer wall, for example using steam, hot gases or electrical means. Furthermore, it is preferable, during drying, to pass a current of gas at 20° to 250° C. through the dryer. The temperature of the gas stream depends on the heat stability of the material to be dried. Particularly sensitive polymers which tend to decompose as a result of heat stress, such as for example proteins, are dried only at room temperature. In the case of synthetic water-soluble polymers such as for example acrylic acid copolymers or acrylamide copolymers, the drying temperature is to be selected so that no crosslinking occurs as a consequence of intermolecular imidization. In this operation, the current of gas can be passed over the material to be dried as a co-current, counter-current or cross-current. It is also possible to heat the dryer only with the aid of the heated current of gas. The combined heating via the heated dryer wall and the hot current of gas is particularly advantageous. Normally a current of air is passed over the material to be dried. Drying of oxidation-sensitive gels is likewise possible by using a current of inert gas.

Another advantage of the invention is that, by virtue of the high efficiency of the drying process according to the invention, only short residence times are required and that, for example at temperatures of about 160° C. and residence times of about 10 to 30 min, crosslinking does not occur. Selective shortening of the residence time in the dryer yields a corresponding increase in the drying temperature with many polymers, particularly with already crosslinked polymers.

A preferred embodiment of the process according to the invention is drying in vacuo at pressures from 0.1 to 200 mbar.

The continuous breakdown of agglomerates and the prevention of agglomeration and also the conveying of hydrogel particles through the dryer is brought about by a high speed rotor arranged axially within the dryer. The rotor is fitted with superstructures such as for example arms, blades or paddles, by which de-agglomeration and axial conveying of the hydrogel particles are achieved. The deagglomeration of the hydrogel particles which have been set in rapid motion by the rotor occurs in particular between the rotor and its superstructures and the inner surface of the dryer. The circumferential velocity of the rotor is preferably 7 to 20 m/sec. However, much higher circumferential velocities are also possible, for example up to 100 m/sec, the upper limit to circumferential velocity being due to the design features of the dryer such as for example dryer size or balancing of the rotor.

The dried material obtained has a uniform, narrow particle size distribution, and subsequent grinding or sieving is no longer necessary. The dried hydrogel is discharged at the end of the dryer through a discharge opening.

EXAMPLE 1

A hydrogel with a moisture content of 75% by weight was prepared by aqueous polymerization of 69.9 mol % of acrylamide, 30 mol % of Na acrylate and 0.1 mol % of methylenebisacrylamide as crosslinking agent, in accordance with AT 88/3090. The hydrogel was pre-comminuted to about 5 mm and continuously introduced via a metering screen in an amount of 5 kg/h to a 110 liter jacket-heated cylinder (180° C. jacket temperature) of length 2.27 m and internal diameter 0.25 m fitted with an axially located rotor provided with mixing and conveying blades. The rotor speed was set at 535 revolutions per minute, corresponding to a circumferential velocity of 7 m per sec, a current of hot air at 190° C. was simultaneously blown through the cylinder as a co-current relative to the product stream in an amount of 450 m$^3$/h.

The hydrogel, during its passage through the drying cylinder, was dried to a residual moisture content of 7% by weight. The average residence time in the drying cylinder was 30 minutes. The dried hydrogel was discharged at 1.34 kg/h with an average particle size of 3.5 mm determined by sieve analysis. No agglomerates were present, and a subsequent comminution was unnecessary.

EXAMPLES 2 to 7

The hydrogel was dried by the procedure of Example 1 but, as given in Table 1, the rotor speed or circumferential velocity, the rate of introduction of moist hydrogel, the jacket temperature and the temperature of the air current, which in Examples 6 and 7 was passed through as a counter-current relative to the product stream, were varied. Table 1 likewise shows the discharge rate of dried hydrogel, the average residence time in the dryer, the residual moisture content and the average particle size of the dried hydrogel.

COMPARATIVE EXAMPLE V 8

The hydrogel was to have been dried by the procedure of Example 1, but with a rotor speed of 200 revolutions per minute, corresponding to a circumferential velocity of 2.6 m per sec. However, owing to the low rotor speed the cylinder became blocked after about 15 min with the material to be dried so that drying had to be discontinued.

COMPARATIVE EXAMPLE V9

110 kg of the hydrogel according to Example 1 which had been pre-comminuted to about 5 mm were charged into a cylindrical, jacket-heated, batch-operated 160 liter dryer with a blade rotor (supplied by Drais). The rotor speed was set at 42 revolutions per min, corresponding to a circumferential velocity of 1.5 m per sec. The jacket temperature was 180° C. After 5 hours' drying time, a product with a residual moisture content of 10% by weight was obtained which was present in the form of agglomerates of 1 to 20 cm in diameter and subsequently had to be comminuted.

TABLE 1

| Drying of a hydrogel with a moisture content of 75% by weight | | | | | | | | |
|---|---|---|---|---|---|---|---|---|
| Example | 1 | 2 | 3 | 4 | 5 | 6 | 7 | V8** |
| Rotor speed (rpm) | 535 | 800 | 1000 | 1200 | 1500 | 1200 | 800 | 200 |
| Circumferen- | 7 | 10.5 | 13.1 | 15.7 | 19.6 | 15.7 | 10.5 | 2.6 |

TABLE 1-continued

Drying of a hydrogel with a moisture content of 75% by weight

| Example | 1 | 2 | 3 | 4 | 5 | 6 | 7 | V8** |
|---|---|---|---|---|---|---|---|---|
| tial velocity (m/sec) | | | | | | | | |
| Feed rate of moist hydrogel (kg/h) | 5 | 11.9 | 19.9 | 24.8 | 30.0 | 76.9 | 58.7 | — |
| Discharge rate of dried hydrogel (kg/h) | 1.34 | 3.2 | 5.3 | 6.6 | 8.0 | 21.1 | 16.3 | — |
| Average residence time (min) | 30 | 20 | 12 | 10 | 8 | 25 | 25 | — |
| Jacket temp. (°C.) | 180 | 180 | 180 | 180 | 180 | 190 | 190 | 180 |
| Air current (m³/h) | 450 | 450 | 450 | 450 | 450 | 95* | 95* | — |
| Air current (°C.) | 190 | 190 | 190 | 190 | 190 | 145 | 145 | — |
| Residual moisture (% by weight) | 7 | 7 | 7 | 6 | 6 | 9 | 10 | — |
| av. particle size (mm) | 3.5 | 3.0 | 2.5 | 1.8 | 1.5 | 2.5 | 2.5 | — |

*Air current as a counter-current relative to the product stream
**Drying cylinder blocked

What we claim is:

1. A process for the continuous drying of a hydrophilic polymer gel, comprising the steps of:
   (a) feeding the wet polymer gel into a cylindrical dryer fitted with a high speed rotor,
   (b) drying the polymer gel in said dryer at temperatures of 20° to 250° C. and at a circumferential velocity of the rotor of 6 to 100 m/sec, whereby the polymer gel is prevented from agglomerating, is partially comminuted and is conveyed axially through the dryer, after which the dried polymer gel is discharged from the dryer.

2. The process of claim 1, wherein the circumferential velocity of the rotor is 7 to 20 m/sec.

3. The process of claim 1, wherein the dryer is heated externally.

4. The process of claim 1, wherein a current of gas at 20° to 250° C. is passed through the dryer.

5. The process of claim 1, wherein drying is carried out in vacuo at a pressure of 0.1 to 200 mbar.

* * * * *